United States Patent [19]

Desai

[11] 3,898,690

[45] Aug. 5, 1975

[54] PHASE-LOCKED LOOP FOR AN ELECTRONIC SECTORING SCHEME FOR ROTATING MAGNETIC MEMORY

[75] Inventor: Ashok K. Desai, Chatsworth, Calif.

[73] Assignee: Pertec Corporation, Chatsworth, Calif.

[22] Filed: Sept. 6, 1974

[21] Appl. No.: 503,728

[52] U.S. Cl. .......... 360/51
[51] Int. Cl. .......... G11b 5/09
[58] Field of Search .......... 360/51, 39

[56] References Cited

UNITED STATES PATENTS

| | | | |
|---|---|---|---|
| 3,412,385 | 11/1968 | Wang et al. | 360/51 |
| 3,778,793 | 12/1973 | Hayashi et al. | 360/51 |
| 3,789,379 | 1/1974 | Breikss | 360/51 |

*Primary Examiner*—Vincent P. Canney
*Attorney, Agent, or Firm*—Lindenberg, Freilich, Wasserman, Rosen & Fernandez

[57] ABSTRACT

In a rotating magnetic memory, a phase-locked loop tracks pulses derived from sector marks on means mechanically connected to rotate with the memory. The output frequency of the phase-locked loop, which is significantly higher by a factor of N than the frequency of the sector mark pulses, is cyclically counted down to divide each revolution of the memory into M equally time spaced sectors. Third and fourth order filtering in the phase-locked loop assures a high degree of precision and consistency in the sectoring.

7 Claims, 1 Drawing Figure

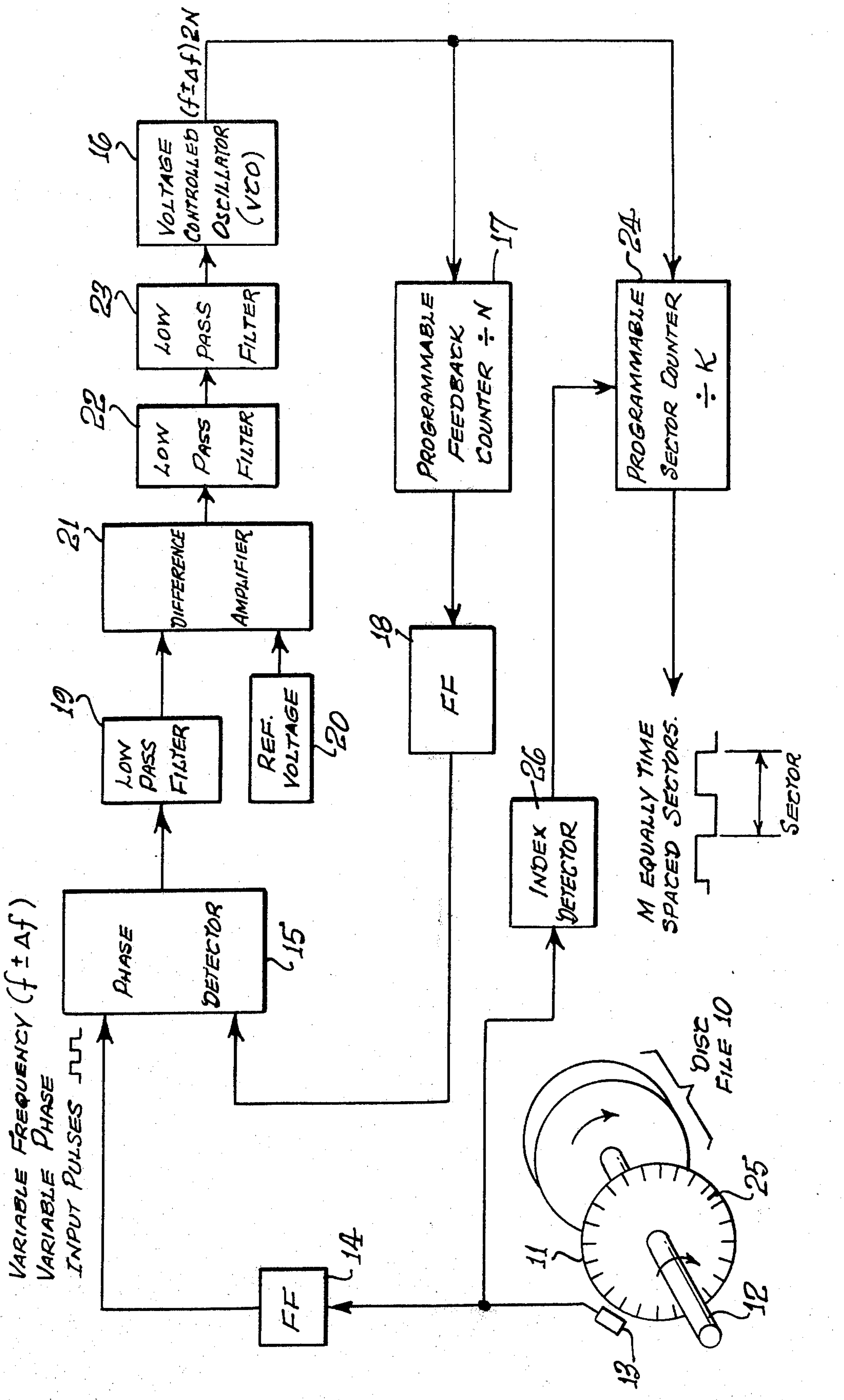
VARIABLE FREQUENCY (f ± Δf)
VARIABLE PHASE
INPUT PULSES
PHASE DETECTOR
15
LOW PASS FILTER
19
REF. VOLTAGE
20
DIFFERENCE AMPLIFIER
21
LOW PASS FILTER
22
LOW PASS FILTER
23
VOLTAGE CONTROLLED OSCILLATOR (VCO)
16
(f ± Δf)2N
PROGRAMMABLE FEEDBACK COUNTER ÷ N
17
FF
18
PROGRAMMABLE SECTOR COUNTER ÷ K
24
INDEX DETECTOR
26
M EQUALLY TIME SPACED SECTORS.
SECTOR
DISC FILE 10
FF
14
11
12
13
25

PHASE-LOCKED LOOP FOR AN ELECTRONIC SECTORING SCHEME FOR ROTATING MAGNETIC MEMORY

BACKGROUND OF THE INVENTION

This invention relates to rotating magnetic memories for digital data processing systems, and more particularly to apparatus for dividing (sectoring) a rotating memory into equally time spaced sectors.

In rotating magnetic memories, such as magnetic drum or disc files, it is advantageous to divide the tracks into equally time spaced sectors. Each sector may then be used to store one or more bytes, each byte consisting of a predetermined number of binary digits (bits). One approach represented by U.S. Pat. No. 3,105,228 has been to read evenly spaced pulses stored on a separate track, and to employ those pulses to synchronize a local oscillator the output of which is then used to cyclically count down from an index a predetermined number of pulses for each sector. The problem with that approach is the need to dedicate a track of the magnetic recording media and sophisticated read electronics to develop sector timing signals.

Another similar approach has been to format the sector timing information with the data information. This requires additional format decoding electronics and also used some of the data storage space on the data tracks of the magnetic memory. That, and additional tolerances of compatibility requirements to reading recorded data on other memory devices reduces the total data storage capacity of the magnetic memory.

Others have employed a separate disc with slots to divide the data tracks directly into sectors, one slot for each sector. This technique has the advantage of not using up part of the memory capacity, but lacks the ability or versatility of dividing one revolution of the rotating magnetic memory into any desired number of sectors. What is desired is a system that is both versatile and precise, and does not require any of the data storage space on the record media.

SUMMARY OF THE INVENTION

In accordance with the present invention, each revolution of a rotating magnetic memory is divided into an integer M of sectors with precision by detecting sector marks on means mechanically connected to rotate with the memory, generating from the detected sector marks a pulse train at a frequency $f \pm \Delta f$ that is a function of the memory speed, and applying the pulse train to a phase-locked loop to produce pulses at a higher frequency by a known factor, 2N. The pulses at this higher frequency are counted down in a cyclic counter to repeatedly divide each revolution of the memory into M equally time spaced sectors with a high degree of precision and consistency. To assure this high degree of precision in the timing (spacing) of the sectors, more than second order filtering is employed in the phase-locked loop.

The novel features that are considered characteristic of this invention are set forth with particularity in the appended claims. The invention will best be understood from the following description when read in connection with the accompanying drawings.

BRIEF DESCRIPTION OF THE DRAWINGS

The sole FIGURE is a block diagram of a preferred embodiment of the invention.

DESCRIPTION OF THE PREFERRED EMBODIMENTS

Referring now to the drawings, a rotating magnetic memory 10 is shown as a disc file which may be of the moving-head type or the fixed-head type. The heads are not shown since their use only benefits from the present invention in accessing word storage locations in equally time spaced sectors of recording tracks. The heads do not play a role in electronically dividing the tracks into sectors.

A slotted disc 11 of ferromagnetic material is connected to a shaft 12 on which the memory discs turn at nominal speeds of 1500, 2400 or 3600 RPM. The slots are detected by a magnetic sensor 13 off the edge of the slotted disc. An alternative arrangement is a slotted disc of any opaque material and a photoelectric sensor. In either case each slot sensed constitutes a sector mark, but in accordance with the present invention, the pulses derived from the sector marks are not used directly to time sectors for the purpose of storing or reading data. Instead, the pulses are used to synchronize a phase-locked loop (PLL) with the speed of the memory. An output of the PLL is then used for electronically timing sectors for data storage and recovery. Consequently, it is evident that the number of slots on the slotted disc are fixed and equally spaced. However, one revolution of the magnetic memory can then be electronically divided into a large number of possible combinations of equally time-spaced sectors.

The sensed slots produce a train of pulses which trigger a J-K type flip-flop 14 connected such that it toggles or changes state with every pulse thus derived from the slotted disc. The output of the flip-flop is thus a square wave at a frequency $f \pm \Delta f$, where $f$ in cycles per second is the product of half the number of slots on the disc and the speed of the disc file in revolutions per second. The variation in frequency $\Delta f$ is small (less than 1.0%) and varies very slowly because the disc file, which is a heavy inertial load, is driven by an induction motor whose speed is controlled by a separate speed control system, such as by a phase angle control of an AC voltage waveform applied to the motor. Notwithstanding how small and slow the variation, it is necessary for the electronic sectoring system to vary accordingly with a high degree of accuracy in order to maximize data storage space. This scheme is equal to or better than direct mechanical sectoring in terms of available data storage space for a given number of sectors per revolution.

The phase-locked loop is comprised of a phase detector 15 and voltage controlled oscillator (VCO) 16. The latter produces an output signal at a frequency some whole multiple, 2N, times the input frequency. A counter 17 divides the VCO frequency by the integer N. A flip-flop 18 divides the output of the counter 17 by 2, thus providing a square wave feedback signal at the frequency $f \pm \Delta f$. The phase difference between the feedback signal and the input signal is detected by phase detector 15 and filtered by a low-pass filter 19 to produce a phase error signal.

The phase error signal thus produced is not applied directly to the VCO, as in some conventional PLLs. Instead it is first compared with a reference voltage from an adjustable and regulated source 20. The comparison is made in a differential amplifier 21. This reference voltage is used to set the center frequency of the VCO, i.e., to set the frequency desired without any phase error signal. The output of the differential amplifier 21 is an error signal which has been subjected to only second order filtering. First order filtering is provided by the inherent integration function of the VCO, and second order filtering is provided by the low-pass filter 19 in a conventional manner. Third and fourth order filtering is then provided by two additional low-pass filters 22 and 23 connected in cascade to provide for better tracking of rate of change of frequency (disc file speed), $f \pm \Delta f$. Also, the third and fourth order filtering significantly reduce the AC ripple of the output voltage of the differential amplifier 21. Consequently, the control voltage applied to the VCO is approximately DC. In that manner, the rate of change of VCO frequency is controlled to follow only the low frequency variations in speed of the disc file.

The transient response of the PLL is designed such that it tracks the low frequency variations, like disc speed, perfectly and almost instantaneously. However, the high frequency variations, like slot-to-slot time jitter of the slotted disc, are ignored due to the third and fourth order filtering. To reduce steady-state phase errors, a very high loop gain is used.

If third and fourth order filtering were not present, modulation of the VCO output may be significant even though the feedback signal applied to the phase detector 15 may track the input frequency and phase within the desired tolerance, because the VCO effectively multiplies any phase error by a factor of 2N. Such variation in the output of the VCO would prevent the M sectors from being equally time spaced. The judicious choice of the additional time constants provided by the third and fourth order filters of known bandwidth significantly reduce the modulation of the VCO output frequency to improve the PLL operation without deteriorating or unstabilizing the loop. Consequently, when counted down by a programmable sector counter (count-down circuit) 24, the resulting output of that counter has a period equal to the designed time space of the M equally time spaced sectors.

In order that the beginning of the first sector will always start at the same place, an additional slot 25, called an index slot, is provided at the center between two consecutive slots of the slotted disc 11. An index detector circuit 26 detects the pulse produced by this index slot from among all other pulses from the slot sensor 13. An alternative arrangement for producing a single index pulse once for each disc file revolution is to provide a single slot or hole at a different radius of the same slotted disc, or on a separate disc, and a separate magnetic or photoelectric sensor. In either case, the electronically generated sector pulses from the counter 24 are synchronized with the index pulse such that the first sector pulse is identified and would occur at the same physical point on the disc during each revolution within the tolerances allowed. The index pulse thus produced resets the sector counter 24 during each slotted disc revolution.

The integer K by which the counter 24, is programmed to divide is determined from the equation $$M = \frac{2N(f \pm \Delta f)}{K}$$

The numbers $K$ and $N$, both integers, are selected to permit dividing one revolution into a whole number, $M$ of sectors. This is predetermined, starting with a known frequency $f$, and programmed by the proper selection of $N$ and $K$. In practice, the integer $N$ is selected and designed into the PLL of the disc file system designed to run at a known RPM, but the factor $K$ is not selected until the disc file system is dedicated to a particular data processing system. The factor $K$ is then programmed, either in a reprogrammable way, as by plug board programming arrays, or in an unalterable way by substitution or alteration of the counter circuit boards. In either case, there is a tremendous advantage in having a disc file system with electronically timed sectors that can be programmed to fit the needs of a data processing system once the disc file system is dedicated to the particular data processing system. One basic design of the electronic sectoring system will then easily satisfy the needs of many different applications for the disc file system.

Although a particular embodiment of the invention has been described and illustrated herein, it is recognized that modifications and variations may readily occur to those skilled in the art. It is therefore intended that the claims be interpreted to cover such modifications and variations.

The embodiments of the invention in which an exclusive property or privilege is claimed are defined as follows:

1. Apparatus for electronically dividing a rotating memory into a whole number of equally time spaced sectors comprising:

means mechanically connected to rotate in unison with said memory, said means being divided into a number of evenly spaced sectors by sector marks, means for detecting said sector marks and generating a pulse train at a frequency $f \pm \Delta f$, where $\Delta f$ represents the magnitude of fluctuations in frequency of the pulse train due to fluctuations in the speed of revolution of said memory, a phase-locked loop for producing an output signal at a frequency significantly greater than said train of pulses by a known factor, said loop being stabilized in phase and frequency by continual phase comparison of said train of pulses with a feedback signal produced by continually dividing said output signal by said known factor, and digital means for continually dividing said output signal by a predetermined integer to produce a timing signal having a number of cycles equal to said whole number of equally time spaced sectors.

2. In a rotating magnetic memory, apparatus for electronically dividing each revolution of the memory into a plurality of equally time spaced sectors comprising:

means mechanically connected to rotate in unison with said memory, said means having sector marks evenly spaced in a circle around its center of rotation, means for sensing said sector marks and generating a train of pulses from said sector marks as they are sensed, a phase-locked loop having a voltage controlled oscillator for producing an output signal at a frequency significantly greater than said train of pulses, said oscillator being stabilized in phase and frequency by a correction voltage signal derived from a continual phase comparison of said train of pulses with a feedback signal obtained from said oscillator signal by digital frequency dividing means, and means for cyclically counting down a predetermined number of cycles of said output signal to produce a timing signal having a predetermined number of cycles during each revolution of said memory.

3. The combination defined in claim 1 including higher order low pass filtering than second order filtering of any correction voltage signal derived from phase comparison of said sector marks and said feedback signal.

4. The combination in claim 3 including:

means for providing an index mark to rotate in unison with said sector marks, means for detecting said index mark to produce an index pulse once per revolution of said memory, and means for synchronizing said means for counting down cycles of said output signal, whereby division of each memory revolution into a whole number of equally time spaced sectors begins at the same point during each revolution of said memory.

5. Apparatus for generating a sector timing signal which divides one revolution of a rotating magnetic memory into a whole number of equally time spaced sectors comprising:

a surface connected to rotate on the same axis with said memory, said surface having a plurality of equally spaced sector marks on a circle, the center of said circle being on said axis, means for sensing said sector marks as they pass by a fixed point in space during each revolution of said memory to generate a continuous train of pulses at a frequency that is a function of the speed with which said memory revolves about said axis, a phase-locked loop for producing output pulses at a higher frequency by a known factor, said phase-locked loop being connected to receive said continuous train of pulses, whereby the output pulses of said phase-locked loop are synchronized with said continuous train of pulses, and means for counting down output pulses from said phase-locked loop to effectively divide the total number of output pulses produced during each revolution of said record medium into a whole number of equally spaced sectors thereby producing at the output of said count-down means a cyclic waveform having a period for each cycle equal to the time-space of each sector.

6. The combination in claim 5 including higher order low pass filtering than second order filtering of any correction signal derived from any phase error between said train of pulses generated from said sector marks and a feedback signal in said loop.

7. The combination of claim 6 including:

means for providing an index mark to rotate in unison with said sector marks, means for detecting said index mark to produce an index pulse once per revolution of said memory, and means for synchronizing said means for counting down cycles of said output signal, whereby division of each memory revolution into a whole number of equally time spaced sectors begins at the same point during each revolution of said memory.

* * * * *